June 3, 1930. H. D. GEYER 1,761,527
SHOCK ABSORBING PITMAN ARM
Filed May 21, 1928
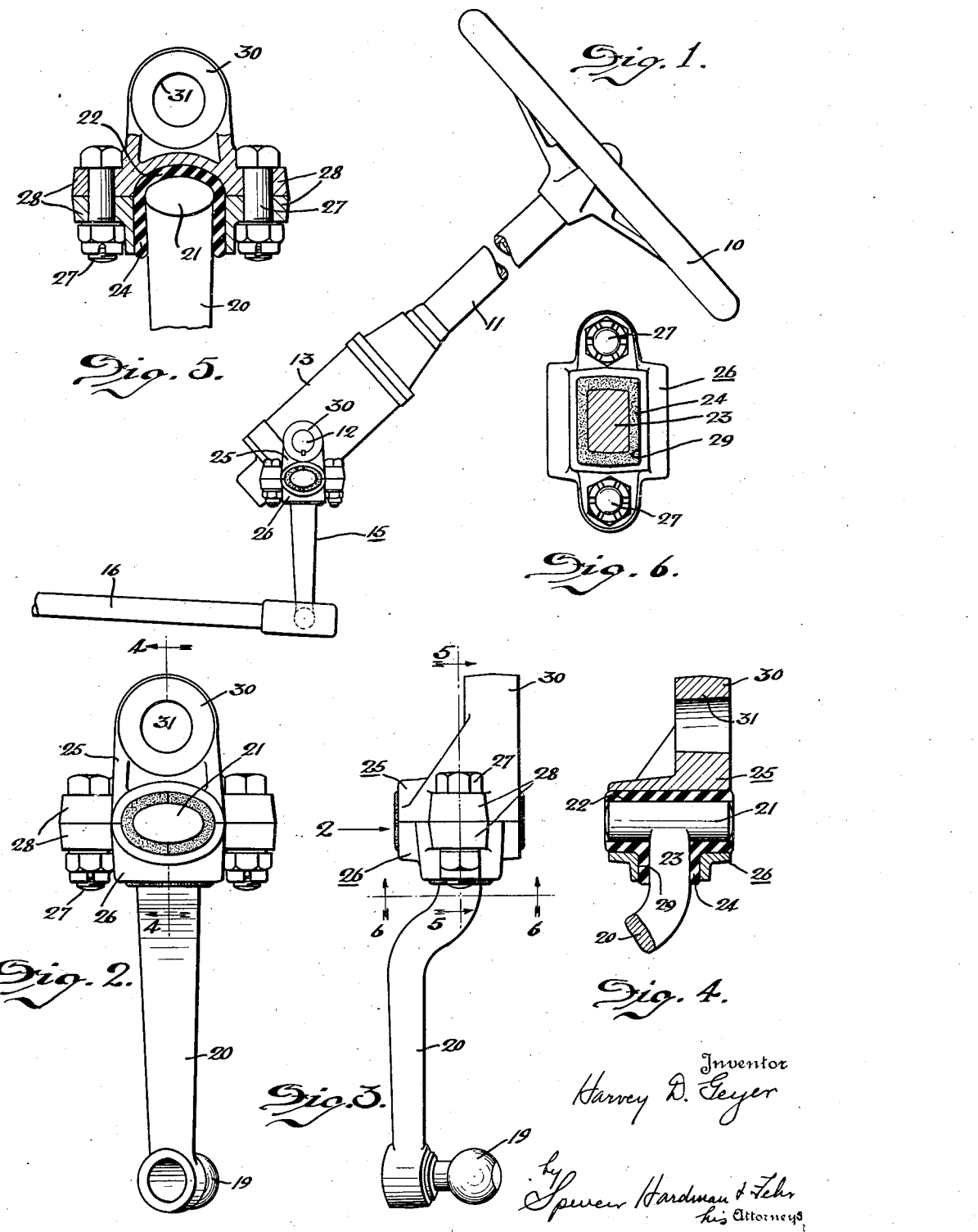

Patented June 3, 1930

1,761,527

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

SHOCK-ABSORBING PITMAN ARM

Application filed May 21, 1928. Serial No. 279,368.

This invention relates to a shock-relieving pitman arm interconnecting a rocker shaft with a reciprocating part and is especially adapted for use in the steering mechanism of automotive vehicles.

An object of this invention is to provide a very simple and efficient construction for a pitman arm having a yielding, non-metallic joint therein, whereby to minimize the transmission of vibrations and shocks through said pitman arm.

Further objects and advantages of the present invention will be apparent from the following description, reference being had to the accompanying drawings, wherein a preferred embodiment of one form of the present invention is clearly shown.

In the drawings:

Fig. 1 is a somewhat diagrammatic view showing a pitman arm built according to this invention interconnecting the rocker shaft with the drag link in an automobile steering mechanism.

Fig. 2 is an elevation of the pitman arm looking in the direction of arrow 2 in Fig. 3.

Fig. 3 is an elevation at right angles to Fig. 2.

Fig. 4 is a vertical section on line 4—4 of Fig. 2.

Fig. 5 is a vertical section on line 5—5 of Fig. 3.

Fig. 6 is a horizontal section on line 6—6 of Fig. 3.

Similar reference characters refer to similar parts throughout the drawings.

Numeral 10 designates the steering wheel of an automobile which drives the steering shaft 11, which in turn is arranged to rock in either direction the rocker shaft 12 by suitable and well known mechanism encased in housing 13. 15 designates as a whole the pitman arm which is fixed at its pivot end to the projecting end of rocker shaft 12 and which is connected at its outer end to the drag link 16 by means of the well known ball and socket connection.

This arm 15 comprises a main shank portion 20 which terminates at its inner end in a transverse pin 21 which extends perpendicularly to the plane in which the pitman arm swings. (See Fig. 4.) Preferably this transverse pin 21 is made in flat oval section and arranged as clearly shown in Figs. 1, 2 and 5. A soft rubber block 22, preferably molded in halves so as to be easily inserted in place, encases the transverse pin 21 and has a projecting portion 24 encasing a short portion 23 of the shank 20, thus forming a sort of T-shaped elastic bushing upon the T-shaped end of shank 20.

The inner or pivot end of the pitman arm comprises the housing members 25 and 26 which are very firmly clamped upon the rubber block 22 by the short bolts 27 passing through opposed ears 28 integral with the housing members 25 and 26. Housing member 26 has a central aperture 29 (see Fig. 6) which is sufficiently large to permit the outer end of shank 20 (before ball 19 has been assembled thereupon) to be threaded therethrough, thus providing for the proper assembly of member 26. The soft rubber block 22 is put in place upon transverse pin 21 and then housing member 26 is slid up along shank 20 until its aperture 29 is telescoped upon the projecting rubber portion 24 surrounding the portion 23 of shank 20.

After this the upper housing member 25 is set down upon block 22 and the two halves of the housing are firmly clamped together by bolts 27 to put the rubber under the desired initial compression and cause a nonslipping bond between the surfaces of the rubber block and the confining metal walls.

The upper housing member 25 has integrally formed therewith a projection 30 which is apertured at 31 to receive the end of rocker shaft 12 and be suitably fixed thereto in any well known manner. It will now be clear that the rubber block 22 completely isolates the outer shank portion 20 of the pitman arm from the inner pivot portion 25, and thus there is no metal-to-metal connection between the drag link 16 and the rocker shaft 12. Thus small vibrations in drag link 16 will be damped out and large sudden shocks will be smoothed out instead of being transmitted to the steering wheel 10. It will also be clear that this arm will yield only slightly under bending stresses due to the resistance of the compressed rubber to the rotation of the flat section transverse pin 21, and also due to the compression of the rubber portion 24 surrounding the adjacent portion 23 of shank 20. It is also obvious that this elastic joint will be universally yieldable to some extent.

While the form of embodiment of the present invention as herein disclosed, constitutes a preferred form, it is to be understood that other forms might be adopted, all coming within the scope of the claims which follow.

What is claimed is as follows:

1. A steering mechanism for an automotive vehicle including a pitman arm having a non-metallic yielding joint therein, said arm comprising: a swinging shank portion having a transverse pin rigid with its inner end, an elastic rubber block encasing the inner end of said shank and said transverse pin, and a metallic member encasing and confining said rubber block under initial compression and isolated thereby from said shank, said member constituting a continuation of said shank.

2. A steering mechanism for an automotive vehicle including a pitman arm having a non-metallic yielding joint therein, said arm comprising: an outer shank portion having a transverse pin rigid with its inner end and extending perpendicular to the plane in which said arm swings, a soft rubber block surrounding said pin and having a projection thereon surrounding the adjacent portion of said shank, and a metal housing clamped upon said rubber block and confining same under pressure, said housing having an integral projection adapted to be connected to a rocking member.

3. A pitman arm interconnecting a rocker shaft with a reciprocating part, said arm comprising: an outer shank portion connected to said reciprocating part and having a transverse pin rigid with its inner end, a soft rubber block surrounding said pin and the adjacent portion of said shank, and an inner portion fixed to said rocker shaft and constituting a metal housing encasing and confining said rubber block under compression and isolated thereby from said outer shank portion.

4. A pitman arm interconnecting a rocker shaft with a reciprocating part, said arm comprising: an outer shank portion connected to said reciprocating part, and having a flat section transverse pin fixed upon its inner end, a soft rubber bushing surrounding said pin, and an inner portion fixed to said rocker shaft and constituting a metal housing encasing and confining said rubber bushing under initial compression and isolated thereby from said outer shank portion.

5. A steering mechanism for an automotive vehicle including a pitman arm having an isolating soft resilient rubber joint therein located between the two ends of said pitman arm, said joint being universally yieldable under bending stresses in said arm.

In testimony whereof I hereto affix my signature.

HARVEY D. GEYER.